Sept. 29, 1964
M. A. MALINA
3,150,515
METHOD AND APPARATUS FOR THE CONTINUOUS
MEASUREMENT OF FREEZING POINTS
Filed July 20, 1961
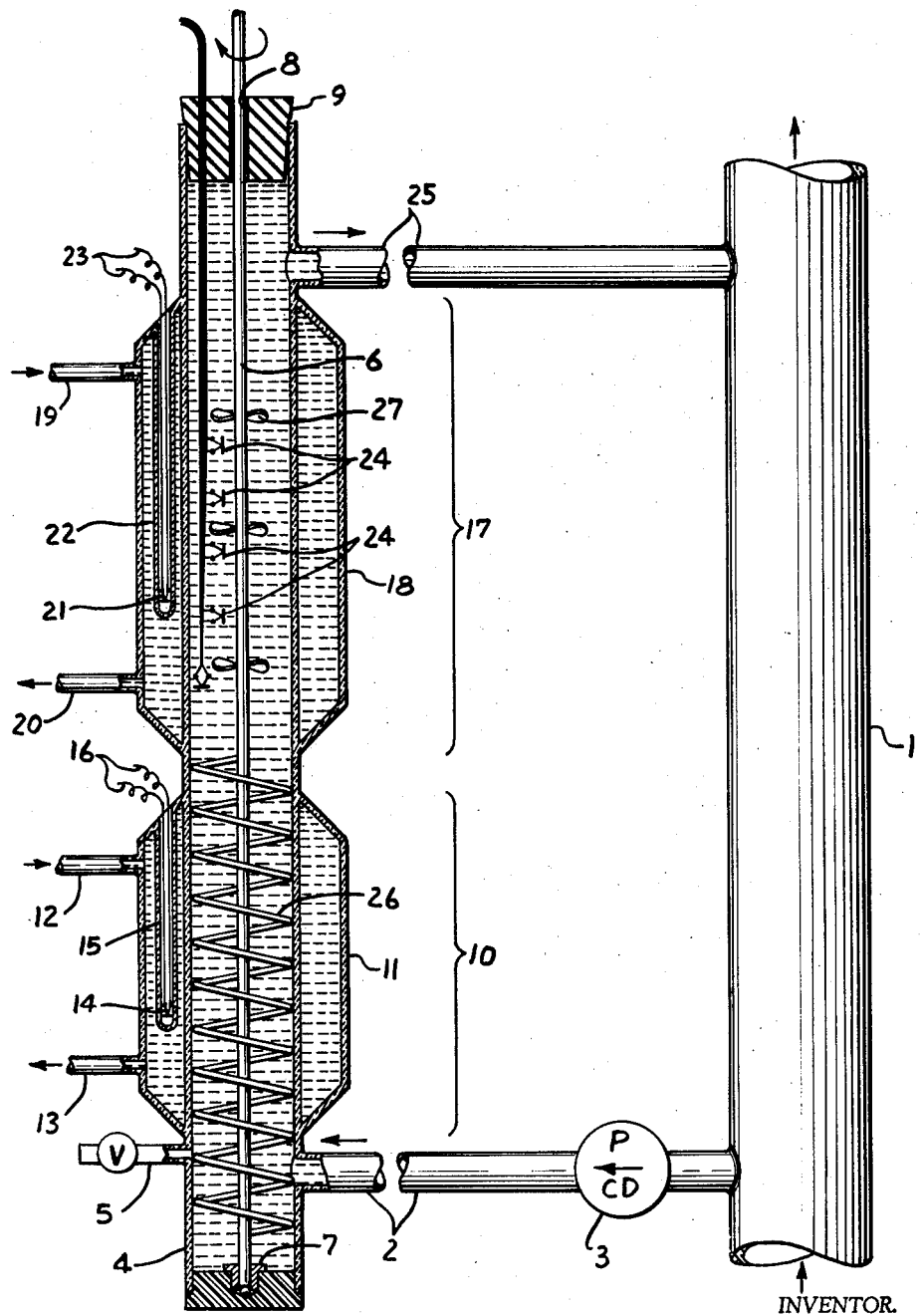
INVENTOR.
MARSHALL A. MALINA
BY
Gary, Desmond & Parker
ATTYS

United States Patent Office 3,150,515
Patented Sept. 29, 1964

3,150,515
METHOD AND APPARATUS FOR THE CONTINUOUS MEASUREMENT OF FREEZING POINTS
Marshall A. Malina, Wilmette, Ill., assignor to Velsicol Chemical Corporation, Chicago, Ill., a corporation of Illinois
Filed July 20, 1961, Ser. No. 125,478
5 Claims. (Cl. 73—17)

This invention relates to the continuous measurement of freezing points and an apparatus therefor. More particularly, this invention relates to the control and/or analysis of liquid streams having a recognizable freezing point by the continuous measurement and optionally automatic recording of the freezing point of the liquid.

While it is generally known that the freezing point of liquids can be utilized to determine their purity, concentration, and certain physical properties, the apparatus and procedures heretofore used to determine freezing points, or melting points, have been designed for single unit or batch-scale operation. A small sample is usually isolated from the main body of liquid and placed in a sealed tube where the melting point or freezing point is measured while heating or cooling the tube. Various improvements in apparatus have been developed, such as the Thiele apparatus, the hot stage apparatus, and the automatic temperature recording devices, but even with these improvements the melting or freezing point is still determined from isolated, individual samples, in a non-continuous operation. Single or batch determination of freezing or melting points does not lend itself to automatic or continuous control. Furthermore, considerable manual labor is involved in charging the batch-type apparatus, thus preventing automatic analysis.

The present invention, on the other hand, affords continuous measurement of the freezing point of a flowing liquid. The invention permits automatic continuous measurement with manual reading or automatic recording of the freezing or melting point temperature suitable for use in automatic control or automatic analysis systems.

Thus, one object of the present invention is to provide a method for continuously measuring the freezing points of liquids.

Another object of this invention is to provide an apparatus for the continuous measurement of the freezing points of flowing liquids.

Other objects and advantages of the present invention will be apparent from the following specification and accompanying diagrammatic drawing of an apparatus for the continuous measurement of freezing points of liquids according to the method of this invention.

The process for the continuous measurement of the freezing point of flowing liquids embodied in the present invention is applicable to flowable and flowing liquids having a measurable freezing temperature. The process comprises, in general, continuously diverting a portion of the main body of liquid to a vertically disposed tube and partially freezing it therein into a slush-like suspension of solid crystals in liquid, followed by slowly heating the suspension until all the crystals have melted. A distinct interface boundary is usually formed in the melting zone. Above this boundary only liquid exists; below it is a suspension of the crystals in liquid. The temperature at this interface boundary is the melting point, or freezing point, of the liquid. The location of the boundary can usually be found visually, although location with an interface locating device is also readily accomplished, if completely automatic measurement is desired. The temperature at the interface can be measured visually by means of a thermometer, or can be measured by any of the devices common to the art, such as thermocouples, resistance thermometers, thermistors, and the like. The temperature can also be automatically recorded by any of the commonly known temperature recording devices.

It is essential to the performance of this process that the freezing zone temperature, the melting zone temperature, and the sampling stream velocity be so controlled that equilibrium conditions exist in the vertical tube in the area of the interface boundary. These variables are dependent upon the particular liquid to be measured. Generally, a knowledge of the approximate freezing point of the stream and a careful adjustment of sampling stream velocity and freezing and heating zone temperatures will rapidly establish equilibrium conditions. Further adjustment of these control factors will place the interface boundary at a suitable and convenient level in the heating zone of the vertical tube.

One specific embodiment of the present invention is the measurement of the temperature at several places both above and below the previously described interface boundary. Thus a plotting of the temperatures measured at several points in the freezing and heating zones and at the interface boundary at a particular instant defines a curve from which the freezing point can be readily obtained with greater accuracy than by the measurement of the interface boundary only, although this latter method is of sufficient accuracy for most applications.

The process of this invention and the apparatus embodied herein as a means of carrying out the process will be readily understood from a study of the accompanying drawing.

Referring to the drawing, a portion of the flowing liquid contained in main conduit 1 is diverted into inlet conduit 2, and by any of the fluid metering and propelling means common to the art, such as metering pump 3, is charged into and forced up through vertical tube 4.

The diverted liquid stream upon entering vertical tube 4 is optionally seeded by a frozen crystal of liquid, obtained from a partially frozen sample of the liquid in main conduit 1, entering vertical tube 4 through seed inlet conduit 5 propelled by any of the suspension propelling means common to the art, if such seeding is necessary and/or desirable.

The liquid sampling stream in vertical tube 4 is stirred throughout its residence therein by stirring elements, for example, by impeller blades 27 and coil 26 attached to stirring rod 6 which is rotatably disposed in journal bearing 7 at the bottom of vertical tube 4, and which passes through journal bearing 8 in stopper 9 at the top of vertical tube 4 to rotatable connection with stirrer driving means. The stirred liquid sampling stream is forced upward in vertical tube 4 through freezing zone 10, wherein the liquid stream is partially frozen by freezing means 11, to form a suspension of solid crystals in the liquid. The freezing can be readily accomplished by heat transfer such as by conduction or convection with a colder fluid. As an example, in the drawing freezng means 11 is a liquid conduction heat exchanger with the cooling liquid entering inlet conduit 12 and exiting at outlet conduit 13.

In order to maintain equilibrium conditions in the area of the interface, which is essential to this process, the freezing zone temperature must be accurately controlled. This control can readily be accomplished as shown in the drawing, by temperature sensing means 14, such as a thermocouple as shown, disposed in thermowell 15 in freezing means 11, electrically or pneumatically connected to temperature control means (not shown) in a cooling liquid source (not shown) by connectors 16, which may be electrical wires, as shown, or a pneumatic conduit (not shown). Thus, a variation in the temperature of freezing zone 10, reflected by a corresponding variation in the temperature of freezing means 11, is sensed by temperature sensing means 14, said temperature sensing means 14 creating a signal which is transmitted to the temperature control, causing a corrective variation in the temperature of the cooling liquid. The cooling liquid then corrects the temperature in freezing zone 10 by circulating through freezing means 11.

The suspension of solid crystals in liquid in the lower portion of vertical tube 4 is slowly heated in an upper melting zone 17 by heating means 18, wherein the solid crystals melt to the liquid form. The heating can be readily performed by conduction or convection with a fluid, by electrical resistance wire, or by other heating means common to the art. As an example of suitable heating means, in the drawing heating means 18 is a fluid conduction heat exchanger wherein the heating fluid enters the exchanger through inlet conduit 19 and exits through outlet conduit 20.

The heating zone temperature is also a critical variable of this process and must be accurately controlled to maintain equilibrium conditions in the area of the liquid-crystals in liquid interface. Like the control of the temperature of freezing zone 10, the temperature of heating zone 17 can also be accurately controlled, as shown in the drawing by temperature sensing means 21, such as a thermocouple as shown, disposed in thermowell 22 in heating means 18, electrically or pneumatically connected to temperature control means (not shown) in a heating fluid source (not shown) by connectors 23, which may be electrical wires, as shown, or pneumatic conduit (not shown). Thus, a variation in the temperature of heating zone 17, reflected by a corresponding variation in the temperature of heating means 18, is sensed by temperature sensing means 21, said sensing means 21 creating a signal which is transmitted to the temperature control means in the heating fluid source, causing a corrective variation in the temperature of the heating fluid. The heating fluid then corrects the temperature in heating zone 17 by circulating through heating means 18.

The melting suspension of crystals in liquid forms a distinct interface boundary in heating zone 17, above which only liquid exists and below which the suspension exists. The temperature at this interface boundary is determined by temperature sensing means 24, which may be a thermometer or one or more thermocouples as shown, or other temperature measuring device.

The liquid stream in vertical tube 4 above heating zone 17 is exited from vertical tube 4, through outlet conduit 25 to main conduit 1, where the diverted sample stream thus intermixes with the main body of liquid at a point downstream of the junction of inlet conduit 2.

As a specific embodiment of this invention it is contemplated that the diverted sampling stream can be readily propelled through inlet conduit 2 and vertical tube 4 by means of a Pitot tube in main conduit 1 in connection with inlet conduit 2. It is further contemplated that by the use of the said Pitot tube, metering pump 3 can be replaced by a control valve to deliver a constant flow of sampling stream.

As another specific embodiment of this invention, liquid in the bottom of vertical tube 4, and the suspension of solid crystals in liquid in freezing zone 10, are stirred by stirrer element 26, which is fastened to stirring rod 6 and is in intimate communication with the vertical walls of vertical tube 4 to prevent freezing thereon and ultimate stoppage of the upward movement of the suspension. It is preferred to use a helically coiled, corrosion-resistant wire as stirrer element 26, although impeller blades such as blades 27 may also be used in place of coil 26.

Still another specific embodiment of this invention is the location of the interface boundary by mechanical means (not shown), while another embodiment is the measurement of the temperature of the interface by more complicated means, such as thermocouples 24, or other means previously described, although the interface can be located visually and the temperature thereof measured by relatively simple means, such as by a thermometer adjusted so that its bulb intercepts the interface. Furthermore, it is preferred to use a multipliicty of temperature sensing means, such as the thermocouples 24, shown in the drawing, in order to obtain a number of temperatures both below and above the interface to provide points for the plotting of a melting curve, for greater accuracy in determining the freezing point.

The following example illustrates the operation of the process and apparatus of this invention and demonstrates the advantages thereof:

Using the apparatus shown in the drawing, constructed of glass, hexachlorocyclopentadiene at normal room temperature was continuously pumped through inlet conduit 2 by metering pump 3 at a rate which varied from 8 to 10 ml. per minute. The hexachlorocyclopentadiene sample stream was seeded with solid crystals of hexachlorocyclopentadiene, previously prepared by partially freezing a portion of liquid hexachlorocyclopentadiene into a slush-like suspension of crystals in liquid, by intermittently injecting the suspension through inlet conduit 5 by air pressure created, for example, by actuation of a rubber bulb, not shown, connected to conduit 5. The seeded sampling stream was partially frozen by means of a stream of liquid isopropanol flowing through heat exchange jacket 11 from a constant temperature bath (not shown) cooled by Dry Ice in liquid acetone (−20° C.). The cooled isopropanol was circulated through heat exchange jacket 11 at a rate of from 5 to 10 ml. per minute by means of a metering pump (not shown) in inlet conduit 12 and returned from heat exchange jacket 11 to the cooling bath by return conduit 13. The partially frozen sampling stream was stirred by stirring element 26 constructed from a Nichrome wire coil. The partially frozen sampling stream was heated in heating zone 17 by normal room temperature air circulated through heating jacket 18.

The temperature of the liquid-crystals in liquid interface in the heating zone was measured by a thermometer (temperature sensing means 24) passing through stopper 9 at the top of vertical tube 4. The location of the liquid-crystals in liquid interface in vertical tube 4 was adjusted in heating zone 17 by adjusting the temperature of the cooling liquid in heat exchange jacket 11. A decrease in the temperature of the cooling liquid resulted in a raising of the interface in tube 4, while an increase in the cooling liquid temperature lowered the interface.

The temperature of the liquid-crystals in liquid interface on repeated determinations yielded a freezing point temperature of 10.8° C., 11.0° C., 10.8° C., 11.0° C., 11.4° C., and 10.9° C., which corresponded to the freezing point as measured by the standard technique of placing the sample liquid in a test tube with a plunger type stirring rod and immersing the tube in a Dewar flask containing a cooling liquid.

Although I have shown and described the preferred apparatus and method of the present invention, it will be understood, as indicated, that changes may be made in the details thereof without departing from the scope of my invention as comprehended by the following claims.

I claim:

1. A process for the continuous measurement of the freezing point of a flowing liquid which comprises continuously diverting a portion of the main body of the flowing liquid as a sampling stream to adjacent the bottom of a vertically disposed measuring zone, partially freezing said sampling stream in the lower portion of said zone to form a suspension of solid crystals in liquid, heating said suspension in the upper portion of said zone until all the crystals have melted, measuring the melting point temperature of the sampling stream at the interface of the suspension of solid crystals in liquid and the heated liquid sampling stream, and returning the liquid sampling stream to the main body of flowing liquid at a point downstream from the point of sampling stream withdrawal.

2. A process for the continuous measurement of the freezing point of a flowing liquid which comprises continuously diverting a portion of the main body of flowing liquid as a sampling stream to adjacent the bottom of a vertically disposed measuring zone, intermittently seeding the said liquid sampling stream with solid crystals of the liquid to be measured, partially freezing the seeded sampling stream to form a suspension of solid crystals in liquid, heating said suspension in the upper portion of said zone to melt the solid crystals, measuring the melting point temperature of the sampling stream at the interface of the suspension of solid crystals in liquid and the liquid sampling stream, and returning the liquid sampling stream to the main body of the flowing liquid downstream from the point of sampling stream withdrawal.

3. Apparatus for the continuous measurement of the freezing point of a liquid flowing in a main conduit, comprising a vertical tube with closed top and bottom; rotatable stirring means extending into said tube; a liquid inlet conduit leading from the flowing liquid main conduit to the vertical tube at a point adjacent its bottom; means in said conduit for propelling a portion of the flowing liquid through said tube; a liquid outlet conduit leading from the vertical tube adjacent its top to the flowing liquid main conduit at a point downstream of the inlet conduit junction; means for partially freezing the liquid in the lower portion of the vertical tube adjacent the inlet conduit; means for heating the resulting partially frozen liquid suspension in the vertical tube in the upper portion of the vertical tube adjacent the outlet conduit; and temperature sensing means in the vertical tube at the interface of the said suspension and said heated liquid.

4. Apparatus for the continuous measurement of the freezing point of a liquid flowing in a main conduit, comprising a vertical tube with closed top and bottom; a liquid inlet conduit leading from the flowing liquid main conduit to the vertical tube at a point adjacent to its bottom; means for propelling a portion of the flowing liquid through the vertical tube; a liquid outlet conduit leading from the vertical tube adjacent to its top to the flowing liquid main conduit at a point downstream of the inlet conduit junction; a seed inlet conduit leading to the vertical tube adjacent to the inlet conduit junction; means for partially freezing the liquid in the vertical tube embracing approximately the lower one-half the height of the vertical tube; means for heating said frozen liquid suspension in the vertical tube embracing approximately the upper one-half of said vertical tube; stirring means comprising a center rod rotatably supported by said top and bottom of the vertical tube passing through said top including side-wall scraping elements attached to the center rod and disposed in said lower tube portion; and temperature sensing means in the vertical tube at the interface of the suspension and the heated liquid.

5. Apparatus for the continuous measurement of the freezing point of a liquid flowing in a main conduit, comprising a vertical tube with closed top and bottom; a liquid inlet conduit leading from the flowing liquid main conduit to the vertical tube at a point adjacent its bottom; means for propelling a portion of the flowing liquid through the vertical tube; a liquid outlet conduit leading from the vertical tube adjacent to its top to the flowing liquid main conduit at a point downstream of the inlet conduit junction; a seed inlet conduit leading to the vertical tube adjacent to the inlet conduit junction; means for partially freezing the liquid in the vertical tube embracing approximately the lower one-half the height of the vertical tube; means for heating said frozen liquid suspension in the vertical tube embracing approximately the upper one-half of said vertical tube; stirring means comprising an axial rod rotatably supported in said vertical tube; a helical wire in communication with the sides of the vertical tube disposed in said lower tube portion secured to and carried by said rod; impeller blades attached to said rod disposed in said upper tube portion; and temperature sensing means in the vertical tube at and adjacent to the interface of the suspension and the heated liquid.

References Cited in the file of this patent
UNITED STATES PATENTS

| | | |
|---|---|---|
| 2,635,456 | Barstow | Apr. 21, 1953 |
| 2,774,238 | Gerwig | Dec. 18, 1956 |
| 2,782,369 | Werner et al. | Feb. 19, 1957 |
| 2,826,907 | Dickey | Mar. 18, 1958 |
| 3,031,880 | Findlay | May 1, 1962 |